United States Patent [19]
Yang

[11] Patent Number: 5,788,012
[45] Date of Patent: Aug. 4, 1998

[54] METHOD AND APPARATUS FOR AUTOMATICALLY FEEDING LUBRICATING OIL USING MICROCOMPUTER

[75] Inventor: Yun Jong Yang, Seoul, Rep. of Korea

[73] Assignee: Korea Lube-Tech Co., Ltd., Rep. of Korea

[21] Appl. No.: 794,897

[22] Filed: Feb. 5, 1997

[30] Foreign Application Priority Data

May 6, 1996 [KR] Rep. of Korea ............... 1996 14738

[51] Int. Cl.$^6$ ............................................. F01M 1/18
[52] U.S. Cl. ................... 184/6.4; 184/6; 184/39; 222/389
[58] Field of Search ............................ 184/6, 29, 6.4, 184/39; 222/63, 389

[56] References Cited

U.S. PATENT DOCUMENTS

| | | |
|---|---|---|
| 2,852,098 | 9/1958 | Benson . |
| 3,367,545 | 2/1968 | Cook . |
| 3,842,939 | 10/1974 | Satzinger . |
| 4,023,468 | 5/1977 | Poirier . |
| 4,023,469 | 5/1977 | Miller . |
| 4,023,648 | 5/1977 | Orlitzky et al. . |
| 4,445,168 | 4/1984 | Petryszyn .................. 184/6.4 |
| 4,671,386 | 6/1987 | Orlitzky . |
| 4,744,442 | 5/1988 | Bras et al. . |
| 5,012,897 | 5/1991 | Jorissen . |
| 5,038,893 | 8/1991 | Willner et al. ............. 184/6.4 |
| 5,402,913 | 4/1995 | Graf ............................ 184/39 |
| 5,404,966 | 4/1995 | Yang . |
| 5,460,243 | 10/1995 | Patterson ................... 222/389 |
| 5,622,239 | 4/1997 | Orlitzky ...................... 184/39 |

FOREIGN PATENT DOCUMENTS

WO8908800  9/1989  WIPO ..................... 184/39

*Primary Examiner*—Thomas E. Denion
*Attorney, Agent, or Firm*—Leydig, Voit & Mayer, Ltd.

[57] ABSTRACT

A method and apparatus automatically feeds lubricating oil to machine parts using a microcomputer. According to the method and apparatus, the lubricating oil discharge time for each discharge mode is set and the operation of an electrochemical reactor is controlled in accordance with the set discharge mode under the control of the microcomputer. At the completion of the set discharge time, a discharge mode for a preset minimum period of discharge time, such as one month, is set to allow complete discharge of the remaining lubricating oil. The set discharge mode and the determined discharge time are displayed on a liquid crystal display for convenient viewing by a user.

3 Claims, 4 Drawing Sheets

METHOD AND APPARATUS FOR AUTOMATICALLY FEEDING LUBRICATING OIL USING MICROCOMPUTER

FIELD OF THE INVENTION

The present invention relates generally to the operation of feeding lubricant to machine parts, and more particularly to a method and apparatus for automatically feeding lubricating oil by means of the controlled operation of an electrochemical reactor.

BACKGROUND OF THE INVENTION

In the past, an automatic lubricating oil feeding apparatus using gas pressure to control the feeding rate has been proposed to automatically feed lubricating oil or grease to the bearing portions of machine parts of various types of industrial equipment. Such an automatic lubricating oil feeding apparatus has the advantage that it can continuously feed lubricating oil to places that require lubrication, thereby avoiding the need for periodic manual feeding operations.

In that conventional lubricating oil feeding apparatus, the lubricating oil is automatically discharged by a piston which is moved downward by a diaphragm. This diaphragm is extended to move the piston by gas pressure provided by an electrochemical reactor. The gas reaction time and the gas pressure of the electrochemical reactor are adjustable by a control circuit, and the discharge of lubrication oil can be automatically performed for a period extending from several months to several tens of months.

FIG. 1 is a schematic diagram of such a conventional lubricating oil feeding apparatus. Referring to FIG. 1, between an electrochemical reactor 20 and a driving power supply B+, a plurality of resistors R1 to R5 and a plurality of switches S1 to S5 in series with the respective resistors are connected for adjusting the current flowing through the electrochemical reactor 20. A display section for visually indicating the operation of the electrochemical reactor 20 is composed of a light-emitting diode LED, driving transistors Q1, Q2, and Q3, and resistors.

In the illustrated conventional lubricating oil feeding apparatus, the amount of current applied to the electrochemical reactor 20 is varied to adjust the reaction time of the electrochemical reactor (e.g., gas chamber) 20. The amount of current depends on the specific resistance determined by the on/off states of the switches S1 to S5. During the reaction time, the light-emitting diode is turned on to display the operating state of the electrochemical reactor. The reaction time corresponds to the lubricating oil discharge time, and may be extended from one month to several months.

The conventional apparatus described above has drawbacks in that environmental conditions such as the condition inside the bearing position, temperature changes, etc., cannot be compensated for in controlling the discharge time. Further, as time goes by, the internal resistance of the electrochemical reactor may change, causing the current consumption of the reactor to vary. Thus, proper and accurate discharge of lubricating oil in terms of time and amount cannot be achieved.

The conventional oil feeding apparatus is also inconvenient to use in that the predetermined discharge time can be recognized only by inspecting the on/off states of the switches. Furthermore, in the event that a portion of the lubricating oil still remains unused due to external or internal factors when the selected discharge period has elapsed, a user cannot identify whether or not the amount of the remaining lubricating oil would be sufficient for setting another discharge time. As a result, the only option is to discard the remaining oil, resulting in considerable waste.

SUMMARY OF THE INVENTION

It is an object of the present invention to solve the problems involved in the prior art as described above by providing a method and apparatus for automatically feeding lubricating oil whereby a desired discharge time of lubricating oil can be easily determined and controlled.

It is another object of the present invention to provide a method and apparatus for automatically feeding lubricating oil which allows the selected discharge time of lubricating oil to be easily checked by a user.

It is yet another object of the present invention to provide a method and apparatus for automatically feeding lubricating oil which can accurately control the lubricating oil discharge operation with respect to a predetermined discharge time by compensating for changes of the internal resistance of the electrochemical reactor during the discharge time.

It is a further object of the present invention to provide a method and apparatus for automatically feeding lubricating oil which can completely discharge the remaining lubricating oil in a controlled manner when the previously set discharge time has elapsed.

In accordance with these and other objects of the present invention, there is provided a microcomputer-controlled automatic lubricating oil feeding apparatus using an electrochemical reactor. The apparatus comprises a mode selection means for selecting a discharge mode, a microcomputer for computing a discharge time according to the selected mode and controlling the operation of the electrochemical reactor according to the computed discharge time, and a liquid crystal display for displaying the selected discharge mode and/or the computed discharge time under the control of the microcomputer.

In accordance with another aspect of the present invention, there is provided a method of automatically feeding lubricating oil using an electrochemical reactor to control the discharge rate. The method comprises the steps of determining a discharge time for each discharge mode selected, controlling the operation of the electrochemical reactor in accordance with the determined discharge time, detecting the completion of the selected discharge mode, and then setting a discharge mode for a preset minimum period of discharge time when the previously set discharge mode is completed to rapidly discharge the remaining lubricating oil.

BRIEF DESCRIPTION OF THE DRAWINGS

The above objects and other objects, features, and advantages of the present invention will become more apparent in view of the following detailed description of the preferred embodiment with reference to the accompanying drawings, in which.

DETAILED DESCRIPTION OF THE PREFERRED EMBODIMENT

Figure 1:
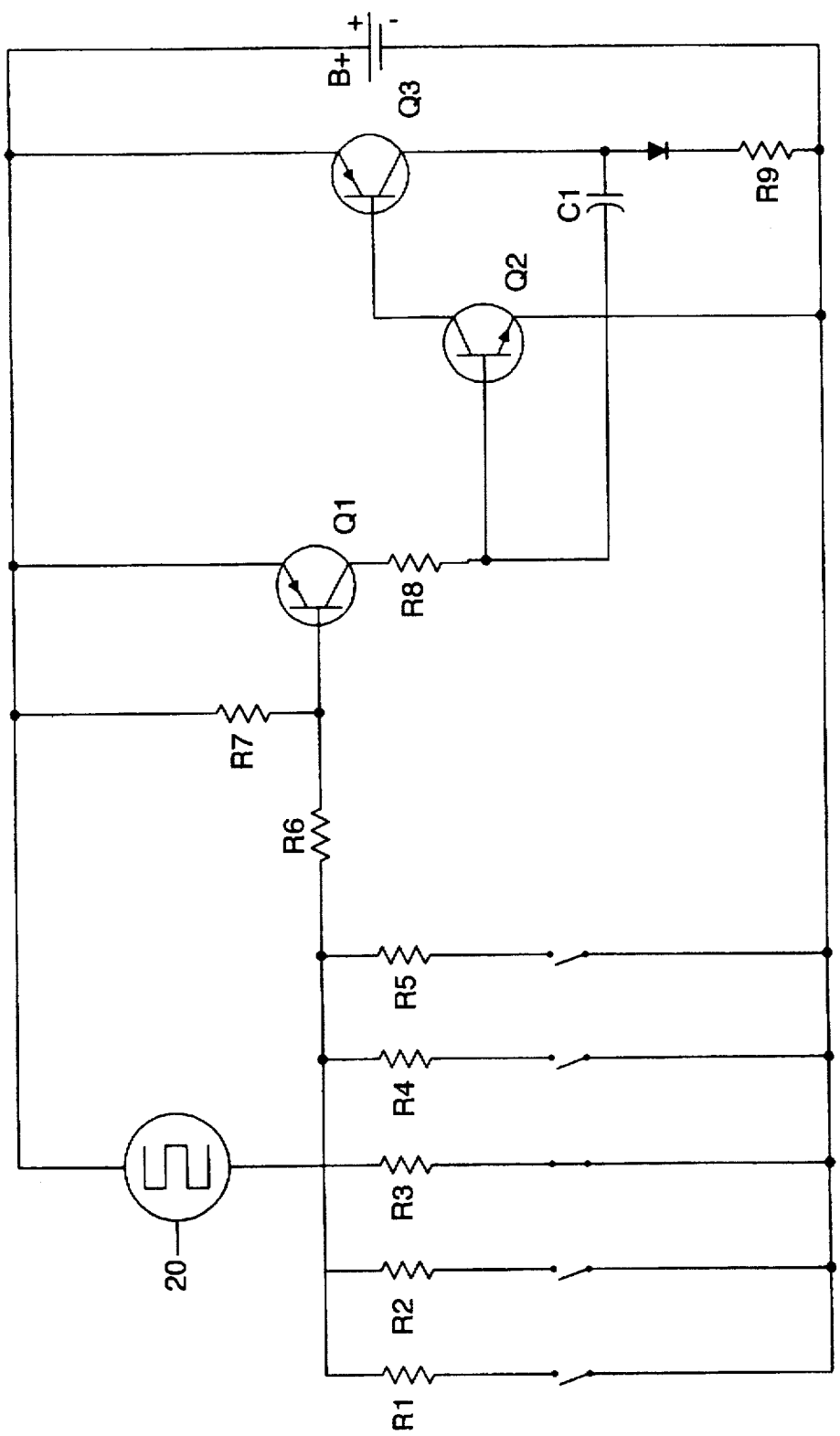
FIG. 1 is a schematic diagram of a conventional lubricating oil feeding apparatus.
Figure 2:
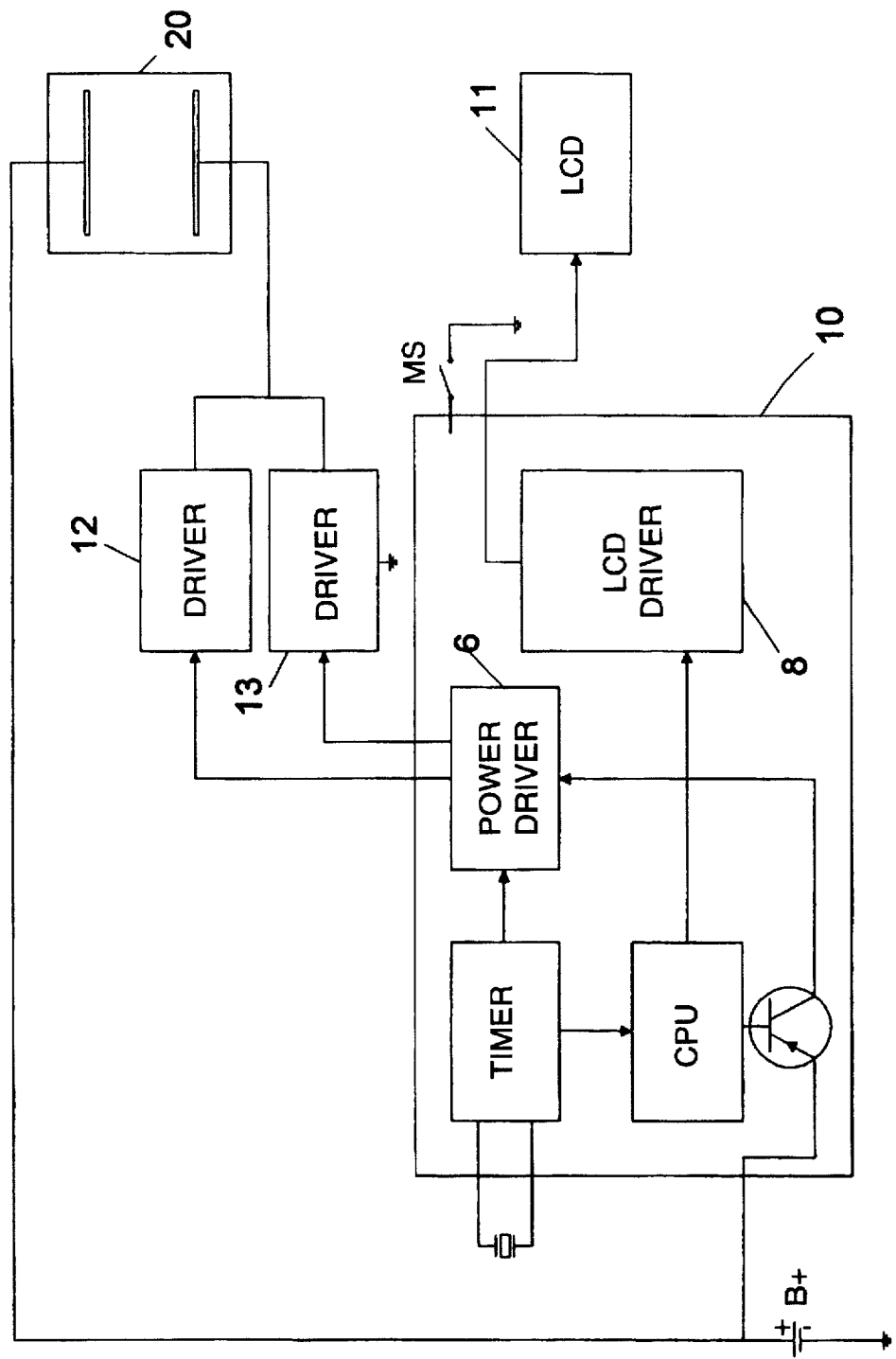
FIG. 2 is a block diagram of the lubricating oil feeding apparatus according to the present invention.

Referring to FIG. 2, the automatic lubricating oil feeding apparatus according to the present invention includes a microcomputer 10 capable of storing and processing input data and performing an input/output control. The feeding apparatus further includes a mode switch MS for inputting discharge time selection to the microcomputer 10, a liquid crystal display (LCD) 11 which is driven by an LCD driver 8 provided in the microcomputer 10, a purge driver 12 which is driven by the maximum output of a power driver 6 provided in the microcomputer 10, a driver 13 which is driven by an output of the power driver 6 in a manner corresponding to the selected discharge mode, and an electrochemical reactor 20 receiving its operating power from the power supply B+ through the purge driver 12 and/or the driver 13.

The operation of the lubricating oil feeding apparatus according to the present invention as illustrated above will now be explained with reference to FIGS. 2 to 4. In operation, the lubricating oil feeding apparatus according to the present invention is properly installed in a machine having parts requiring lubrication. A user manipulates the mode switch MS to select a discharge mode. In the preferred embodiment, in response to the manipulation of the switch MS, the microcomputer 10 performs an operating-month input mode (step S1 in FIG. 3) for selecting one of 1, 2, 3, 6, and 12-month discharge modes. The discharge mode may also be a purge mode.

If it is determined that the selected mode is the purge mode (Step S2 in FIG. 3), the microcomputer 10 turns on its output port (step S3 in FIG. 3) to operate the electrochemical reactor 20 at its maximum electrochemical reaction level. In the illustrated embodiment of FIG. 2, the "on-state" of the output port corresponds to a "LOW" logic level. As the output port is turned on, the output of the power driver 6 is applied to the purge driver 12, and current from the power supply B+ flows to the driver 12 through the electrochemical reactor 20, causing the discharge of the lubricating oil.

On the other hand, if it is determined that an operating-month mode is selected instead the purge mode, the microcomputer 10 performs its control operation in accordance with the selected mode.

Specifically, in the preferred embodiment, the microcomputer controls the driver 13 to operate the electrochemical reactor in an intermittent fashion. The output level of the driver 13 does not depend on the selected mode, but the total output time per unit time, termed the "K time," is varied according to the selected mode. If the operating time arrives (steps S5 in FIG. 3) as a real time counting is performed (step S4 in FIG. 3), a tick clock is generated in the microcomputer 10 and the microcomputer 10 performs the determined mode (step S6 in FIG. 3), turning on its output port (step S7 in FIG. 3).

Figure 3:
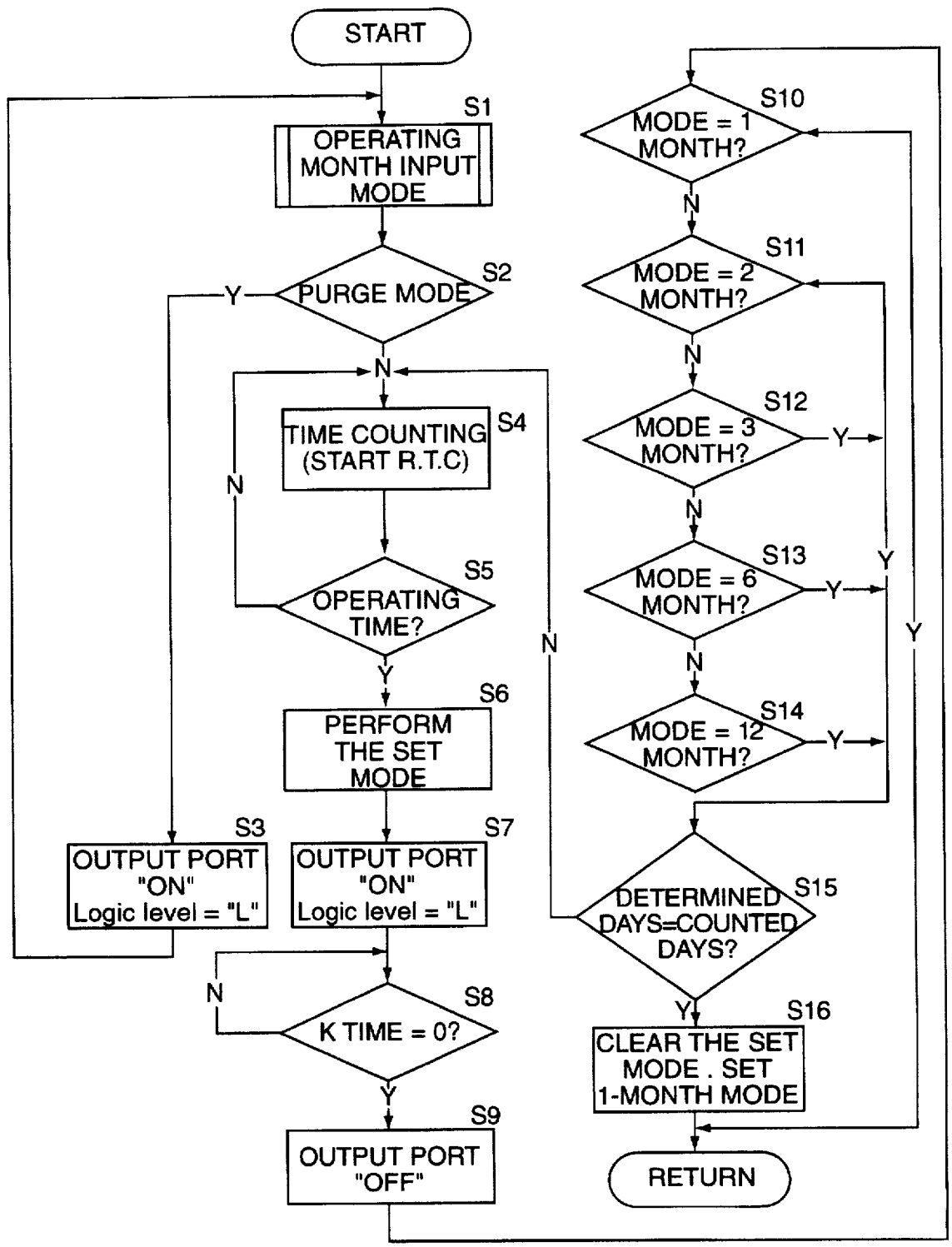
FIG. 3 is a flow chart explaining the lubricating oil feeding method according to the present invention.
Figure 4:
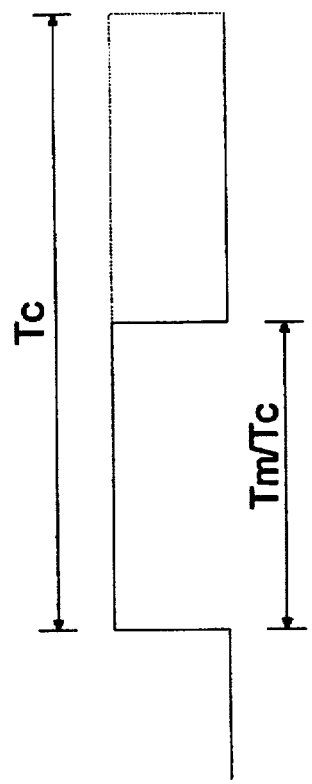
FIG. 4 is a waveform diagram explaining the output control timing according to the present invention.

Thereafter, the microcomputer 10 detects whether or not the output time per unit time is zero (i.e., K time=0) (step S8 in FIG. 3). The state where the K time is zero means the state where the electrochemical reactor does not operate. If it is detected that the K time is zero, the microcomputer 10 turns off its output port (step S9 in FIG. 3) to limit the output of the driver 12 or 13. Here, the term "off-state" of the output port corresponds to a "HIGH" logic level.

Accordingly, the reaction time of the electrochemical reactor 20 is controlled in such a manner that, in order to control the discharge amount of the lubricating oil, the operating time per unit time for each selected mode, i.e., the K time, is determined by the amount of current consumption of the electrochemical reactor 20, which is obtained by computing an expression I×TM+TC, where I is the amount of current, TC is a unit time, and TM is the output time according to the selected mode. The output control timing is illustrated in FIG. 4.

In accordance with the selected mode, the K time is varied. For example, the K time for a 1-month mode will be twice that of a 2-month mode if the efficiency of the electrochemical reactor remains the same. This is because the electrochemical reactor may operate continuously in the 1-month mode, but intermittently in the 2-month mode. It is a feature of the method of this invention to compensate for the variation of the internal resistance of the electrochemical reactor. If it is assumed that the K time for the 1-month mode is Xt, the K time for any other mode can be obtained from the following table.

| MODE | K TIME | DETERMINED DAYS |
|---|---|---|
| 1 MONTH | K = Xt | 30 DAYS |
| 2 MONTHS | K = Xt * ½ * EFFICIENCY | 60 DAYS |
| 3 MONTHS | K = Xt * ⅓ * EFFICIENCY | 90 DAYS |
| 6 MONTHS | K = Xt * ⅙ * EFFICIENCY | 180 DAYS |
| 12 MONTHS | K = Xt * 1/12 * EFFICIENCY | 360 DAYS |

In the table,, the K time for each mode is calculated by multiplying Xt by the efficiency of the gas chamber which is converted from the specific resistance value of the gas chamber in accordance with the passed time.

Thereafter, if it is determined that the counted number of days becomes equal to the selected number of days (step S15 in FIG. 3), the set discharge mode is cleared. The discharge mode for the minimum time period, which in this embodiment is one month, is then set under the control of the microcomputer 10 (step S16 in FIG. 3), so that the remaining lubricating oil can be completely discharged during the minimum time period. At this time, the power driver 6 and the driver 13 operate for the one-month mode until the power supply B+ being supplied thereto is expired.

During the discharge operation, the set mode is displayed on the LCD showing the number of discharge months. Thus, a user can easily read the LCD display to recognize the discharge months of the present mode.

While the present invention has been described and illustrated herein with reference to the preferred embodiment thereof, it will be understood by those skilled in the art that various changes in form and details may be made therein without departing from the spirit and scope of the invention.

What is claimed is:

1. An automatic lubricating oil feeding method under control of a microcomputer using an electrochemical reactor to control a rate of discharge, the method comprising the steps of:

determining a lubricating oil discharge time for a selected first discharge mode;

controlling the operation of the electrochemical reactor in accordance with the determined discharge time;

detecting completion of the selected first discharge mode; and entering a second discharge mode for a preset minimum period of discharge time when the selected first discharge mode is completed to purge remaining lubricating oil.

2. An automatic lubricating oil feeding apparatus using an electrochemical reactor to control a discharge rate comprising:

a mode selection switch for selecting a lubricating oil discharge mode;

a microcomputer for computing a discharge time according to the selected discharge mode and providing a control signal for controlling operation of the electrochemical reactor in accordance with the computed discharge time; and a purge driver for driving the electrochemical reactor at a maximum output rate under the control of the microcomputer; and a discharge driver for driving the electrochemical reactor in accordance with the selected discharge mode under the control of the microcomputer.

3. An automatic lubricating oil feeding apparatus using an electrochemical reactor to control a discharge rate comprising:

a mode selection switch for selecting a lubricating oil discharge mode;

a microcomputer for computing a discharge time according to the selected discharge mode and providing a control signal for controlling operation of the electrochemical reactor in accordance with the computed discharge time;

a liquid crystal display for selectively displaying the selected discharge mode and the computed discharge time under the control of the microcomputer;

a liquid crystal display driver for driving the liquid crystal display under the control of the microcomputer;

a purge driver for driving the electrochemical reactor at a maximum output rate under the control of the microcomputer; and a discharge driver for driving the electrochemical reactor in accordance with the selected discharge mode under the control of the microcomputer.

\* \* \* \* \*